(12) United States Patent
Wang et al.

(10) Patent No.: US 12,519,645 B2
(45) Date of Patent: Jan. 6, 2026

(54) SERVICE INFORMATION COMMUNICATION METHOD AND ELECTRONIC DEVICE

(71) Applicant: HUAWEI TECHNOLOGIES CO., LTD., Guangdong (CN)

(72) Inventors: Chenglu Wang, Shenzhen (CN); Haiyang Liu, Shenzhen (CN); Lei Wang, Nanjing (CN); Zhiwei Ma, Beijing (CN); Junfeng Yang, Xi'an (CN); Weiqing Fang, Munich (DE); Qianjin Hou, Xi'an (CN); Xunfei Suo, Xi'an (CN)

(73) Assignee: Huawei Technologies Co., LTD., Shenzhen (CN)

( * ) Notice: Subject to any disclaimer, the term of this patent is extended or adjusted under 35 U.S.C. 154(b) by 171 days.

(21) Appl. No.: 18/550,499

(22) PCT Filed: Mar. 13, 2022

(86) PCT No.: PCT/CN2022/080510
§ 371 (c)(1),
(2) Date: Sep. 14, 2023

(87) PCT Pub. No.: WO2022/194063
PCT Pub. Date: Sep. 22, 2022

(65) Prior Publication Data
US 2024/0187237 A1   Jun. 6, 2024

(30) Foreign Application Priority Data
Mar. 16, 2021   (CN) .......................... 202110282727.3

(51) Int. Cl.
*H04L 9/32*   (2006.01)
*G16Y 10/75*   (2020.01)
*G16Y 40/35*   (2020.01)

(52) U.S. Cl.
CPC ............ *H04L 9/3213* (2013.01); *G16Y 10/75* (2020.01); *G16Y 40/35* (2020.01); *H04L 2209/805* (2013.01)

(58) Field of Classification Search
CPC ...................................................... H04L 9/3213
See application file for complete search history.

(56) References Cited

U.S. PATENT DOCUMENTS 11,636,458 B1 *   4/2023   Radhakrishnen .. G06Q 20/3223
                                                                    705/75
2016/0337127 A1 *   11/2016   Schultz ................. H04L 9/3234
(Continued)

FOREIGN PATENT DOCUMENTS

CN   204654887 U   9/2015
CN   107453970 A   12/2017
(Continued)

OTHER PUBLICATIONS

Extended European Search Report in European Appln No. 22770418.6, dated May 23, 2024, 13 pages.

*Primary Examiner* — Simon P Kanaan
(74) *Attorney, Agent, or Firm* — Fish & Richardson P.C.

(57) ABSTRACT

Implementations relating to service information communication methods and electronic devices are provided. One method includes: communicating, by a terminal device based on token information, first service information of a first service with an Internet of things (IoT) server corresponding to the first service, wherein the token information is obtained from the IoT server by the terminal device after performing authentication with the IoT server based on user information of the terminal device, and wherein the token information is used by the terminal device to communicate with the IoT server, and communicating, by the terminal device, second service information of the first service with an IoT terminal device corresponding to the first service,
(Continued)

wherein the second service information is associated with the first service information, and wherein the user information of the terminal device is same as user information of the IoT terminal device.

20 Claims, 6 Drawing Sheets

(56) References Cited

U.S. PATENT DOCUMENTS

| | | | |
|---|---|---|---|
| 2018/0270064 A1* | 9/2018 | Gehrmann | H04L 63/08 |
| 2018/0288209 A1* | 10/2018 | Kim | H04L 67/55 |
| 2019/0058697 A1* | 2/2019 | Chang | H04L 63/0807 |
| 2019/0387401 A1* | 12/2019 | Liao | H04W 4/08 |
| 2020/0021481 A1* | 1/2020 | Tsigkogiannis | H04L 67/141 |
| 2021/0195418 A1* | 6/2021 | Reid | H04W 12/61 |
| 2021/0312440 A1* | 10/2021 | Badal-Badalian | G06Q 20/3278 |

FOREIGN PATENT DOCUMENTS

| | | |
|---|---|---|
| CN | 109617978 A | 4/2019 |
| CN | 111093197 A | 5/2020 |
| WO | 2019075317 A1 | 4/2019 |

* cited by examiner

SERVICE INFORMATION COMMUNICATION METHOD AND ELECTRONIC DEVICE

CROSS-REFERENCE TO RELATED APPLICATIONS

This application is a National Stage of International Application No. PCT/CN2022/080510, filed on Mar. 13, 2022, which claims priority to Chinese Patent application Ser. No. 20/211,0282727.3, filed on Mar. 16, 2021, both of which are hereby incorporated by reference in their entireties.

TECHNICAL FIELD

This application relates to the communication field, and more specifically, to a service information communication method and an electronic device in the communication field.

BACKGROUND

To facilitate people's lives, more Internet of things (Internet of things, IoT) devices emerge. Different IoT terminal devices can bring different user experience to a user, and can greatly facilitate life of the user. During communication between an IoT terminal device and an IoT server, data of the IoT terminal device needs to be routed by using a dedicated IoT gateway or an IoT router. When the data of the IoT terminal device needs to be routed by using the dedicated IoT gateway, a communication protocol between the IoT terminal device, the IoT gateway, and the IoT server is a proprietary protocol. In other words, only the IoT terminal device. the IoT gateway, and the IoT server manufactured by a same vendor can communicate with each other according to the proprietary protocol. This increases costs. An IoT terminal device, an IoT gateway, and an IoT server of different vendors cannot communicate with each other, and applicability is limited. When the data of the IoT terminal device needs to be routed by using the router, the data of the IoT terminal device can be routed only to a corresponding IoT server, the IoT terminal device and the IoT server also need to comply with a proprietary protocol, and the IoT terminal device and the IoT server need to be manufactured by a same vendor. This increases costs, and adaptability is limited. In other words, an existing IoT terminal device and an existing IoT server depend on each other, resulting in high communication costs and limited applicability.

SUMMARY

Embodiments of this application provide a service information communication method and an electronic device, to reduce costs and improve applicability.

According to a first aspect. a service information communication method is provided, including: A first terminal device communicates. based on token information. first service information of a first service with an Internet of things IoT server corresponding to the first service, where the token information is obtained from the IoT server after the first terminal device performs authentication with the IoT server based on user information of the first terminal device, and the token information is used by the first terminal device to communicate with the IoT server. The first terminal device communicates second service information of the first service with a first IoT terminal device corresponding to the first service, where the second service information is associated with the first service information. The user information of the first terminal device is the same as user information of the first IoT terminal device.

In the foregoing solution, the first terminal device may perform authentication with the IoT server by using the user information of the first terminal device, and obtain the token information used to communicate with the IoT server. The first terminal device may communicate with the server based on the token information. The user information of the first terminal device is used for authentication in a process of performing authentication between the first terminal device and the IoT server, so that a first IoT terminal device does not need to be bound to the IoT server. When the first IoT terminal device and the IoT server are devices of different vendors, the first IoT terminal device and the IoT server may also communicate with each other. This can improve applicability, and avoid deploying different IoT servers for IoT terminal devices of different vendors. thereby reducing costs. An IoT terminal device A manufactured by a vendor A and an IoT terminal device B manufactured by a vendor B are used as an example. The IoT terminal device A and the IoT terminal device B are devices of a same type. The IoT terminal device A. the IoT terminal device B. and a first terminal device are devices of a same user. The first terminal device may be manufactured by the vendor A or may be manufactured by another vendor. An IoT server belongs to the vendor A. The first terminal device uses user information in an authentication process with the IoT server of the vendor A, and information about the IoT terminal device A or the IoT terminal device B is not used. In this way, the IoT server of the vendor A cannot only provide service information for the IoT terminal device A, but also provide service information for the IoT terminal device B, avoiding a need to specially deploy an IoT server of the vendor B. This can reduce costs and improve applicability.

That the user information of the first terminal device is the same as user information of the first IoT terminal device may be understood as follows: The first terminal device and the first IoT terminal device are devices of a same user. For example, the first terminal device and the first IoT terminal device are registered with a same mobile phone number or logged in with a same Huawei account.

Optionally, in a process in which the first terminal device communicates the first service information of the first service with the IoT server, the first terminal device does not need to use device information of the first IoT terminal device. In this way, the first IoT terminal device and the IoT server may be manufactured by a same vendor or manufactured by different vendors. This reduces costs.

That the first service information is associated with the second service information may be understood as follows: The first service information is the same as the second service information, or the first terminal device processes the first service information to obtain the second service information, or the first terminal device processes the second service information to obtain the first service information. For example, after the first terminal device receives, based on the token information, the first service information sent by the IoT server, the first terminal device may directly send the first service information (where in this case, the first service information is the same as the second service information) to the first IoT terminal device. Alternatively, the first terminal device obtains the second service information after processing the first service information, and sends the second service information to the first IoT terminal device. For another example, when the first terminal device receives the second service information from the first IoT terminal device, the first terminal device directly sends the second service information (where in this case, the second service information is the same as the first service information) to the IoT server. Alternatively, the first terminal device obtains the first service information after processing the second service information, and sends the first service information to the IoT server.

Optionally, communication between the first terminal device and the first IoT device may be performed by using a soft bus channel, or may not be performed through the soft bus channel. In a process in which the first terminal device communicates with the first IoT terminal device through the soft bus channel, the first terminal device may send the first IoT terminal device through the soft bus channel. Certainly, the first terminal device may alternatively send the first IoT terminal device by using a physical channel.

Optionally, communicating the first service information between the first terminal device and the IoT server and communicating the second service information between the first terminal device and the first IoT terminal device are not subject to a sequence.

Optionally, the first service information and the second service information may be control signaling or service data related to the first service. This is not limited in embodiments of this application.

Optionally, that a first terminal device communicates, based on token information, first service information of a first service with an Internet of things IoT server corresponding to the first service includes: The first terminal device receives, based on the token information, the first service information that is of the first service and that is sent by the Internet of things IoT server corresponding to the first service. After the first terminal device receives the first service information, that the first terminal device communicates second service information of the first service with a first IoT terminal device corresponding to the first service includes: The first terminal device sends the second service information of the first service to the first IoT terminal device corresponding to the first service. In other words, this process may be understood as downlink transmission.

Optionally, that the first terminal device communicates second service information of the first service with a first IoT terminal device corresponding to the first service includes: The first terminal device receives the second service information that is of the first service and that is sent by the first IoT terminal device corresponding to the first service. After the first terminal device receives the second service information, that a first terminal device communicates, based on token information, first service information of a first service with an Internet of things IoT server corresponding to the first service includes: The first terminal device sends, based on the token information, the first service information of the first service to the Internet of Things IoT server corresponding to the first service.

In some possible implementations, before the first terminal device communicates the second service information of the first service with the first IoT terminal device corresponding to the first service, the method further includes: The first terminal device establishes a soft bus channel with the first IoT terminal device.

That the first terminal device communicates second service information of the first service with a first IoT terminal device corresponding to the first service includes:

the first terminal device communicates, through the soft bus channel, the second service information of the first service with the first IoT terminal device corresponding to the first service.

The soft bus channel may build a network for devices with a same user identity by using different access technologies (such as Bluetooth. Wi-Fi, and a USB) in different scenarios. The first terminal device has a discovery and connection capability through the soft bus channel. and provides a high-throughput, low-latency, high-reliability, and secure and trustworthy communication channel for various distributed IoT terminal devices (including the first terminal device). The soft bus channel is a distributed intelligent communication highway network between devices that has an effect infinitely close to that of local access. The first terminal device has a soft bus capability for managing connections of various IoT terminal devices, and may discover. in real time, that a new IoT terminal device is connected to a soft bus network. For the IoT terminal device that has been connected, the first terminal device may maintain a capability of connecting to the IoT terminal device in real time, so as to communicate data with the IoT terminal device that has been connected. This capability of the first terminal device is referred to as a bus hub capability.

In the foregoing solution. the soft bus channel can be used to implement interconnection and interworking between devices of different vendors. In other words, the first IoT terminal device and the first terminal device may be manufactured by a same vendor or may be manufactured by different vendors. In other words, in the foregoing solution, the first terminal device, the first IoT terminal device, and the IoT server may be provided by a same vendor or may be provided by different vendors. In this way, interconnection and interworking between devices manufactured by different vendors can be implemented, thereby improving applicability and reducing costs.

In some possible implementations, the method further includes: The first terminal device sends a first query message to the first IoT terminal device through the soft bus channel, where the first query message is used to query the first IoT terminal device for information about the first IoT terminal device.

The first terminal device receives, through the soft bus channel, the information about the first IoT terminal device that is sent by the first IoT terminal device based on the first query message.

Optionally, the information about the first IoT terminal device may also be referred to as capability file description information of the first terminal device.

Optionally, the information about the first IoT terminal device may include at least one of basic information of the first IoT terminal device, at least one piece of service information of the first IoT terminal device, and a first service port address used by the first terminal device to access the first IoT terminal device through the soft bus channel. The basic information of the first IoT terminal device includes at least one of a device name, a device type, vendor information, and a vendor model of the first IoT terminal device. Each piece of service information of the first IoT terminal device indicates each service supported by the first IoT terminal device. For example, the first IoT terminal device is a treadmill, and the treadmill supports services such as querying and reporting of a heart rate or reporting of a distance.

In the foregoing solution. the first terminal device may send, to the first IoT terminal device through the soft bus channel, the first query message used to query the first IoT terminal device, and the first IoT terminal device may send the information about the first IoT terminal device to the first terminal device through the soft bus channel. In this way. the first terminal device may obtain the information about the first IoT terminal device, so as to subsequently communicate with the first IoT terminal device.

In some possible implementations, the information about the first IoT terminal device includes the first service port address used by the first terminal device to access the first IoT terminal device through the soft bus channel.

That a first terminal device communicates, based on token information, first service information of a first service with an IoT server corresponding to the first service includes:

the first terminal device receives, based on the token information. the first service information sent by the IoT server.

That the first terminal device communicates, through the soft bus channel, second service information of the first service with the first IoT terminal device corresponding to the first service includes:

the first terminal device sends, to the first service port address of the first IoT terminal device through the soft bus channel. the second service information associated with the first service information.

In the foregoing solution, in the downlink transmission, the first terminal device may send the second service information to the first IoT terminal device based on the first service port address, so as to avoid a case in which the first terminal device does not know how to send the second service information to the first IoT terminal device.

In some possible implementations, the information about the first IoT terminal device includes service information and address request information, where the address request information is used to request. from the first terminal device. a service port address for the first IoT terminal device to report the first service indicated by the service information.

The first terminal device sends a service request message to the first IoT terminal device based on the address request message and the service information, where the service request message is used to request the first IoT terminal device to report the service information of the first service, and the service request message includes a second service port address for the first IoT terminal device to report the first service.

That the first terminal device communicates, through the soft bus channel, second service information of the first service with the first IoT terminal device corresponding to the first service includes:

the first terminal device receives. through the soft bus channel, the second service information that corresponds to the first service and that is sent by the first IoT terminal device based on the second service port address.

That a first terminal device communicates. based on token information, first service information of a first service with an IoT server corresponding to the first service includes:

the first terminal device sends, to the IoT server based on the token information, the first service information associated with the second service information.

In the foregoing solution. in a process in which the first terminal device requests the information about the first IoT terminal device from the first IoT terminal device, the first IoT terminal device may carry a requirement (namely, the address request information) of the first IoT terminal device for the first terminal device in the information about the first IoT terminal device. The first terminal device may carry, in the service request message sent to the first IoT terminal device, the second service port address for the first IoT terminal device to report the first service. In this way. when the first IoT terminal device needs to report the first service, the first service may be reported to the second service port address.

In some possible implementations, the information about the first IoT terminal device includes the basic information of the first IoT terminal device, and the basic information of the first IoT terminal device includes at least one of the device type, the vendor information, and the device name.

In some possible implementations, after the first terminal device obtains the token information from the IoT server, the method further includes: The first terminal device receives, based on the token information, subscription information that is of the first service and that is sent by the IoT server. That a first terminal device communicates, based on token information, first service information of a first service with a server corresponding to the first service includes:

the first terminal device communicates the first service information with the IoT server based on the subscription information and the token information.

Optionally, the subscription information may include at least one of a subscription package of the first service, a validity period of the first service, an arrears status of the first service, a remaining quantity of use times of the first service, remaining time of the first service. and the like.

In the foregoing solution, when the first terminal device communicates the first service information with the IoT server, the first terminal device needs to consider the subscription information of the first service. To be specific, the first terminal device needs to determine, based on the subscription information, whether the first service information can be communicated with the IoT server. This avoids a case in which the IoT server cannot process the first service information because the first terminal device blindly communicates the first service information with the IoT server.

According to a second aspect. a service information communication method is provided, including: A first IoT terminal device corresponding to a first service establishes a soft bus channel with a first terminal device. The first IoT terminal device communicates. through the soft bus channel, second service information of the first service with the first IoT terminal device corresponding to the first service. The first terminal device is configured to communicate, with an IoT server corresponding to the first service, first service information associated with the second service information. Token information used to communicate a second service between the first terminal device and the IoT server is obtained from the IoT server after the first terminal device performs authentication with the IoT server based on user information of the first terminal device.

In the foregoing solution. the soft bus channel can be used to implement interconnection and interworking between devices of different vendors. In other words, the first IoT terminal device and the first terminal device may be manufactured by a same vendor or may be manufactured by different vendors. In this way, interconnection and interworking between devices manufactured by different vendors can be implemented, thereby improving applicability and reducing costs In other words, in the foregoing solution, the first terminal device, the first IoT terminal device, and the IoT server may be provided by a same vendor or may be provided by different vendors. In this way, interconnection and interworking between devices manufactured by different vendors can be implemented, thereby improving applicability and reducing costs.

In some possible implementations, the method further includes: The first IoT terminal device receives, through the soft bus channel, a first query message sent by the first terminal device, where the first query message is used to query the first IoT terminal device for information about the first IoT terminal device. The first IoT sends the information about the first IoT terminal device to the first terminal device based on the first query message.

Optionally, the information about the first IoT terminal device may include at least one of basic information of the first IoT terminal device. at least one piece of service information of the first IoT terminal device, and a first service port address used by the first terminal device to access the first IoT terminal device through the soft bus channel. The basic information of the first IoT terminal device includes at least one of a device name, a device type, vendor information, and a vendor model of the first IoT terminal device. Each piece of service information of the first IoT terminal device indicates each service supported by the first IoT terminal device. For example. the first IoT terminal device is a treadmill, and the treadmill supports services such as querying and reporting of a heart rate or reporting of a distance.

In some possible implementations, the information about the first IoT terminal device includes the first service port address used by the first terminal device to access the first IoT terminal device through the soft bus channel. That the first IoT terminal device communicates. through the soft bus channel, second service information of the first service with the first IoT terminal device corresponding to the first service includes: The first IoT terminal device receives the second service information sent by the first terminal device based on the first service port address.

In some possible implementations, the information about the first IoT terminal device includes service information and address request information, where the address request information is used to request, from the first terminal device, a service port address for the first IoT terminal device to report the first service indicated by the service information. The method further includes:

the first IoT terminal device receives a service request message sent by the first terminal device based on the address request message and the service information, where the service request message is used to request the first IoT terminal device to report the service information of the first service, and the service request message includes a second service port address for the first IoT terminal device to report the first service.

That the first IoT terminal device communicates, through the soft bus channel, second service information of the first service with the first IoT terminal device corresponding to the first service includes:

the first IoT terminal device sends. through the soft bus channel. the second service information corresponding to the first service to the second service port address of the first IoT terminal device.

In some possible implementations, the information about the first IoT terminal device includes at least one of the device type, the vendor information, and the device name of the first IoT terminal device.

According to a third aspect. this application provides an apparatus. The apparatus is included in an electronic device, and the apparatus has a function of implementing behavior of the electronic device in the foregoing aspects and the possible implementations of the foregoing aspects. The function may be implemented by using hardware, or may be implemented by using hardware executing corresponding software. The hardware or the software includes one or more modules or units corresponding to the foregoing function, for example, a transmission module or unit, a processing module or unit.

Optionally, the apparatus may be the first terminal device or the first IoT terminal device described above.

According to a fourth aspect, this application provides an electronic device, including one or more processors. a memory. a plurality of applications, and one or more computer programs. The one or more computer programs are stored in the memory. The one or more computer programs include instructions. When the instructions are executed by the electronic device, the electronic device is enabled to perform a fault notification method according to any possible implementation of any one of the foregoing aspects.

Optionally, the electronic device may further include a touchscreen and/or a camera. The touchscreen includes a touch-sensitive surface and a display.

Optionally, the electronic device may be the first terminal device or the first IoT terminal device described above.

According to a fifth aspect, this application provides an electronic device, including one or more processors and one or more memories. The one or more memories are coupled to the one or more processors. The one or more memories are configured to store computer program code. The computer program code includes computer instructions. When the one or more processors execute the computer instructions, the electronic device is enabled to perform the service information communication method according to any possible implementation of any one of the foregoing aspects.

According to a sixth aspect, this application provides a computer-readable storage medium, including computer instructions. When the computer instructions are run on an electronic device, the electronic device is enabled to perform the service information communication method according to any possible implementation of any one of the foregoing aspects.

According to a seventh aspect, this application provides a computer program product. When the computer program product runs on an electronic device, the electronic device is enabled to perform the service information communication method according to any possible implementation of any one of the foregoing aspects

DESCRIPTION OF EMBODIMENTS

The following describes the technical solutions in embodiments of this application with reference to the accompanying drawings in embodiments of this application.

When a user uses an IoT terminal device, data of the IoT terminal device needs to be sent to an IoT server, or the IoT terminal device needs to obtain data from the IoT server. For example, when the IoT terminal device is a treadmill. and the IoT server is a body fitness service platform, data generated when the user runs on the treadmill needs to be uploaded to the body fitness service platform, and the body fitness service platform provides guidance for the user based on the data uploaded by the treadmill.

Optionally, the IoT server may include an IoT platform and an IoT application server. The IoT platform is used to adapt and/or forward a protocol packet of the IoT terminal device, and manage a status of whether the IoT terminal device is online. The IoT application server is configured to provide specific service data for the IoT terminal device.

Figure 1:
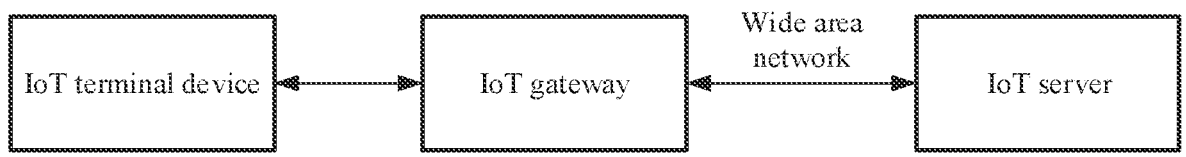
FIG. 1 to FIG. 4 are possible schematic diagrams of communicating service information in the conventional technology.

In a possible implementation, when the data of the IoT terminal device needs to be sent to the IoT server, or the IoT terminal device needs to obtain the data from the IoT server, an IoT gateway needs to be passed through. As shown in FIG. 1, the data of the IoT terminal device needs to be routed to the IoT server through the IoT gateway, or the data from the IoT server needs to be routed to the IoT terminal device through the IoT gateway. In this process, the IoT gateway needs to convert a transmission protocol between the IoT gateway and the IoT terminal device into a transmission protocol between the IoT gateway and the IoT server, and the IoT gateway needs to send device information of the IoT terminal device to the IoT server. The IoT server can identify only an IoT terminal device provided by a vendor of the IoT server. In other words, the IoT terminal device, the IoT gateway, and the IoT server communicate data based on proprietary protocols. In this case, it needs to be ensured that the IoT terminal device, the IoT gateway, and the IoT server are manufactured by a same vendor. In this way, communication between the three devices complies with a transmission protocol customized by the vendor, and a corresponding IoT gateway and a corresponding IoT server need to be deployed for the IoT terminal device. This results in high costs and limited scope of application.

Figure 2:
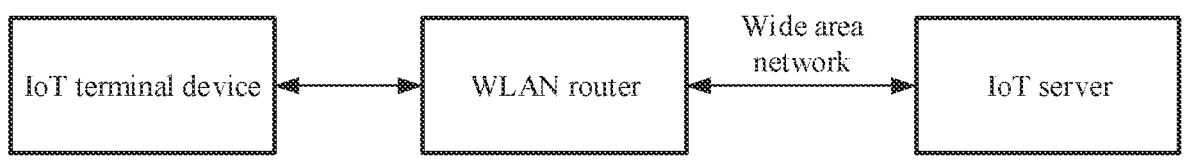

In another possible implementation, when the data of the IoT terminal device needs to be sent to the IoT server, or the IoT terminal device needs to obtain the data from the IoT server, a wireless local area network (wireless local area network, WLAN) router needs to be passed through. As shown in FIG. 2, the data of the IoT terminal device can reach the IoT server only through the WLAN router. In this process, the WLAN router needs to carry information about the IoT terminal device, and the IoT server may identify the IoT terminal device based on the information about the IoT terminal device. The IoT server and the IoT terminal device need be manufactured by the same vendor so that the IoT server can identify the IoT terminal device. The data from the IoT server can reach the IoT terminal device only through the WLAN router. The data from the IoT server needs to carry information about the IoT server. The IoT terminal device identifies the IoT server based on the information about the IoT server. The IoT terminal device can identify the IoT server only when the IoT server and the IoT terminal device are manufactured by the same vendor.

Figure 3:
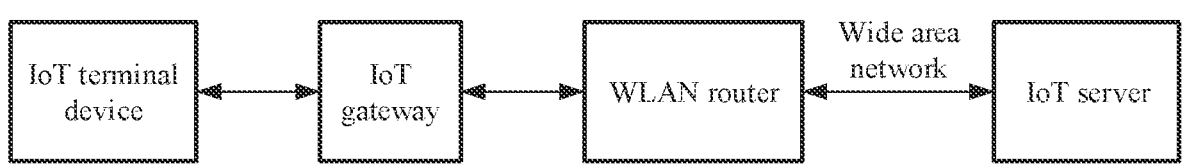

In still another possible implementation, when the data of the IoT terminal device needs to be sent to the IoT server, or the IoT terminal device needs to obtain the data from the IoT server, as shown in FIG. 3, the IoT gateway needs to be first passed through, and then, the WLAN router needs to be passed through. In this manner, a corresponding IoT gateway and a corresponding IoT server from a same vendor need to be deployed for the IoT terminal device. This results in high costs and limited scope of application.

In the foregoing three implementations, the IoT gateway or the WLAN router needs to communicate with the IoT server through a wide area network, and the IoT server and the IoT terminal device need to be manufactured by the same manufacturer. This results in high costs and limited scope of application.

Figure 4:
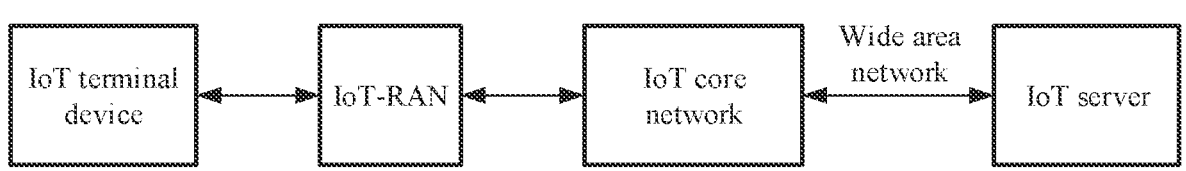

In still another possible implementation, that the data of the IoT terminal device needs to be sent to the IoT server or the IoT terminal device needs to obtain the data from the IoT server may be implemented in a cellular communication manner. For example, as shown in FIG. 4. the data needs to be communicated with the IoT server by using an IoT radio access network (radio access network, RAN) device and an IoT core network device. In this manner, the IoT terminal device needs to have a cellular wireless radio frequency module, which is not applicable to an IoT terminal device that does not have a cellular capability, and an IoT RAN and an IoT core network need to deploy different network slices for different types of IoT terminal devices. In this way, maintenance and operation costs of an operator are increased. In addition, the wide area network needs to perform differentiated processing on the different types of IoT terminal devices. and service requirements of the different types of IoT terminal devices are different. For example, some types of IoT terminal devices perform real-time services. and some types of IoT terminal devices perform non-real-time services. This results in complex wide area network processing and high costs.

In view of the foregoing problem, a first terminal device may perform authentication with an IoT server based on user information of the first terminal device, and obtain token information used to communicate with the IoT server. The first terminal device may communicate with the server based on the token information. The user information of the first terminal device is used for authentication in a process of performing authentication between the first terminal device and the IoT server, so that a first IoT terminal device does not need to be bound to the IoT server. When the first IoT terminal device and the IoT server are devices of different vendors. the first IoT terminal device and the IoT server may also communicate with each other. This can improve applicability, and avoid deploying different IoT servers for IoT terminal devices of different vendors, thereby reducing costs.

Figure 5:
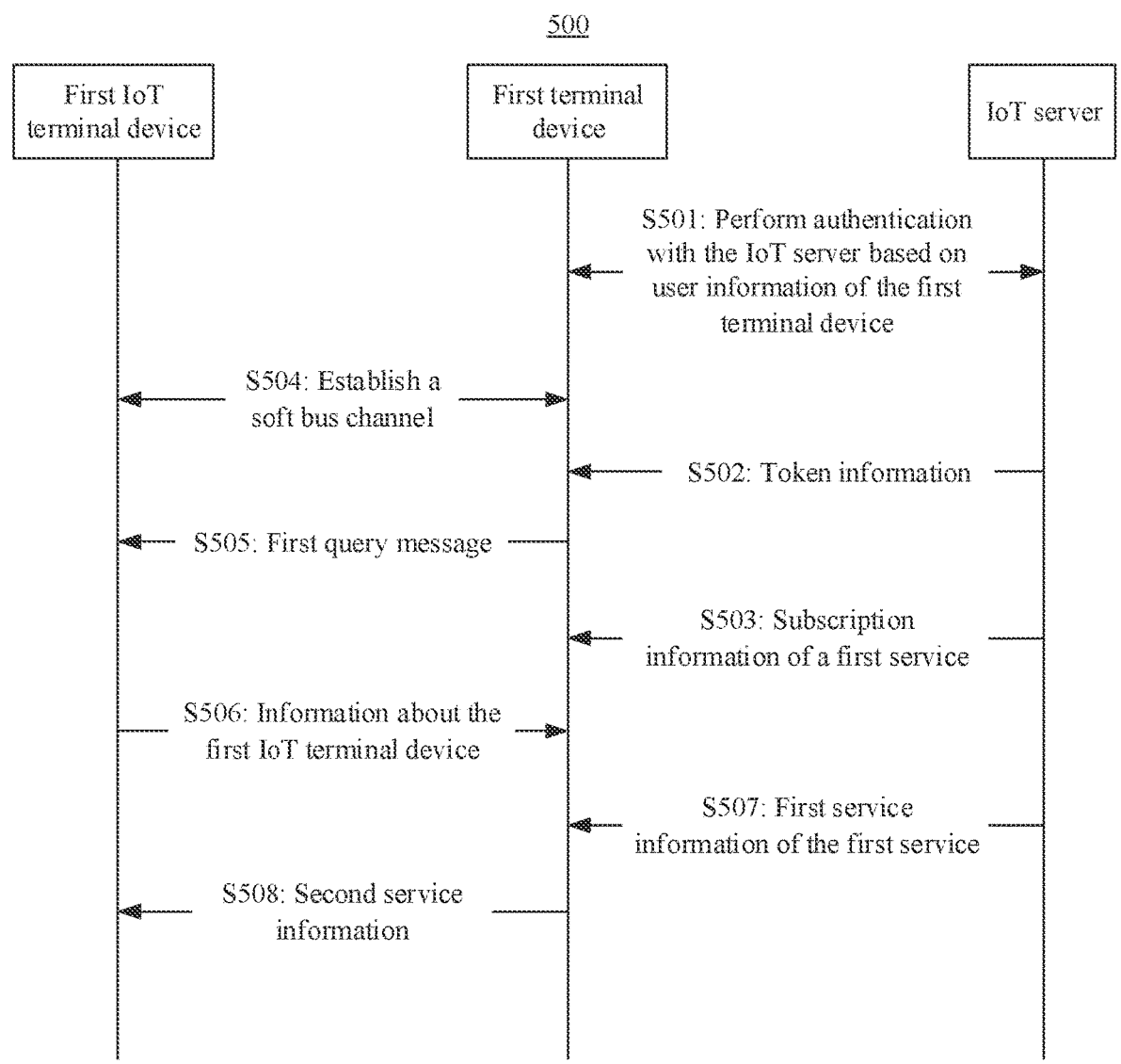
FIG. 5 to FIG. 7 are schematic diagrams of a service information communication method according to an embodiment of this application.

With reference to FIG. 5, the following describes a service information communication method 500 provided in an embodiment of this application. In the method 500. uplink transmission is used as an example for description, and that an IoT device needs to send first service information to an IoT server is used as an example of the uplink transmission. The method 500 includes the following steps.

S501: A first terminal device performs authentication with an IoT server based on user information of the first terminal device.

For example, S501 includes: The first terminal device may receive, by using an application, a login account input by a user, and send the login account input by the user to the IoT server. The IoT server verifies the login account. If the user has registered the login account with the IoT server by using the first terminal device, it indicates that the authentication succeeds, and the IoT server may send authentication success information to the first terminal device. For example, the login account may be a Huawei account. a mobile phone number, or a personal identification number (personal identification number, PIN).

The user information of the first terminal device is the same as user information of the first IoT terminal device in S504. To be specific, the first terminal device and the IoT terminal device are devices used by a same user. In other words, after the first terminal device performs authentication with the IoT server based on the user information of the first terminal device, in a process in which the first terminal device communicates with the first IoT terminal device. the first terminal device does not need to send device information of the first IoT terminal device to the IoT server. In this way, it can be avoided that the IoT terminal device is bound to the IoT server.

S502: After S501, the IoT server sends token information to the first terminal device. and the first terminal device receives the token information sent by the IoT server.

The token information is used by the IoT server to communicate with the first terminal device. In other words, the token information may be understood as a communication key allocated by the IoT server to the first terminal device. The token information may be an identifier of a token (token). indication information indicating the identifier of the token, or the like.

After S502, S503 is performed.

S503: The IoT server sends subscription information of a first service to the first terminal device, and the first terminal device receives the subscription information that is of the first service and that is sent by the IoT server.

Specifically, before S501, the user may subscribe to the first service or register the first service on the IoT server by using a first application of the first terminal device. In other words, the first application of the first terminal device is an application corresponding to the first service. After the IoT server authenticates the first application of the first terminal device and sends the token information, the IoT server may send the subscription information of the first service to the first application of the first terminal device. For example, the subscription information specifically includes a subscription package of the first service, a validity period of the first service, an arrears status of the first service, a remaining quantity of use times of the first service, remaining time of the first service, and the like.

Optionally, in S503, after sending the token information to the first terminal device, the IoT server may actively push the subscription information of the first service to the first application of the first terminal device.

Optionally, in S503, after receiving the token information, the first terminal device may send a second query message to the IoT server, where the second query message is used to query the IoT server for the subscription information of the first service. The IoT server returns the subscription information of the first service to the first terminal device based on the second query message.

It should be noted that S503 is an optional step. To be specific, the IoT server may not send the subscription information of the first service to the first terminal device.

It should be noted that S501 to S503 may be performed once, and steps after S507 may be performed for a plurality of times. In other words, the authentication between the first terminal device and the IoT server may be performed once, and service data may be communicated between the first terminal device and the IoT server for a plurality of times based on the token information for one authentication.

S504: The first terminal device establishes a soft bus channel with the first IoT terminal device.

That the IoT terminal device establishes the soft bus channel with the first terminal device may be understood as that the first IoT terminal device is mounted onto the first terminal device. In other words, the first IoT terminal device may communicate with the first terminal device. Vendors of the first IoT terminal device and the first terminal device may be a same vendor or may be different vendors. The soft bus channel can implement interconnection and interworking between devices of different vendors.

It should be noted that S504 and any step of S501 to S503 may be performed simultaneously. Alternatively, S503 may be performed before any step of S501 to S503. To be specific, the first IoT terminal device may first establish the soft bus channel with the first terminal device, and the first terminal device then performs authentication with the IoT server, or the first terminal device then receives the token information, or the first terminal device then receives the subscription information of the first service. Alternatively, any step of S501 to S503 may be performed before S504. To be specific, the first terminal device may first perform authentication with the IoT server, or the first terminal device first receives the token information, or the first terminal device first receives the subscription information of the first service, and then, the first terminal device establishes the soft bus channel with the first IoT terminal device. In this case, the first IoT terminal device is an IoT terminal device corresponding to the first service. After the first terminal device performs authentication with the IoT server, the first terminal device may report, to the IoT server, information about an IoT terminal device connected to the first terminal device. If the IoT server determines, based on the information reported by the first terminal device, that the first terminal device is not connected to the IoT terminal device corresponding to the IoT server, the IoT server sends a trigger message to the first terminal device, where the trigger message is used to trigger the first terminal device to establish the soft bus channel with the first IoT terminal device, that is, the trigger message is used to trigger S504.

S505: The first terminal device sends a first query message to the first IoT terminal device through the soft bus channel, and the first IoT terminal device receives, through the soft bus channel, the first query message sent by the first terminal device, where the first query message is used to query the first IoT terminal device for information about the first IoT terminal device.

S506: The first IoT terminal device sends the information about the first IoT terminal device to the first terminal device through the soft bus channel, and the first terminal device receives. through the soft bus channel. the information about the first IoT terminal device that is sent by the first IoT terminal device.

Optionally, the information about the first IoT terminal device may include at least one of basic information of the first IoT terminal device, at least one piece of service information of the first IoT terminal device, and a first service port address used by the first terminal device to access the first IoT terminal device through the soft bus channel. The basic information of the first IoT terminal device includes at least one of a device name, a device type, vendor information, and a vendor model of the first IoT terminal device. Each piece of service information of the first IoT terminal device indicates each service supported by the first IoT terminal device. For example, the first IoT terminal device is a treadmill, and the treadmill supports services such as querying and reporting of a heart rate or reporting of a distance.

Optionally, the information about the first IoT terminal device further includes address request information. The address request information is used to request, from the first terminal device, a service port address for the first IoT terminal device to report the first service indicated by first service information. The at least one piece of service information includes the first service information.

After S504, S507 is performed. In other words, a sequence between S507 and S505 or S506 is not limited.

S507: The IoT server sends first service information of the first service to the first terminal device, and the first terminal device receives the first service information of the first service.

Specifically, the first terminal device receives the first service information based on the token information.

In S507, the IoT server may trigger. in two manners, sending of the first service information of the first service to the first terminal device.

Manner 1: The IoT server may actively send the first service information of the first service to the first terminal device. For example, after the IoT server sends the token information to the first terminal device in S402, the IoT server actively sends the service information of the first service to the first terminal device. In other words, when the first terminal device subscribes to the first service on the IoT server, the IoT server may actively push the first service information of the first service after completing authentication on the first terminal device and sending the token information.

Manner 2: If S503 exists, the first terminal device may receive, by using a first application, an operation that is input by the user and that is for a requirement of the first service, and the first terminal device generates user requirement information based on a requirement of the user and the subscription information of the first service, and reports the user requirement information to the IoT server. The IoT server generates, based on the user requirement information, the first service information corresponding to the first service, and sends the first service information to the first terminal device. For example, the first service is a running service, the IoT server is a body fitness service platform, the first IoT terminal device is a treadmill, and the user subscribes to fitness guidance on the body fitness service platform by using a sports and health application of the first terminal device. The user sets. in the first application of the first terminal device, a requirement for a desired motion effect, for example, a desired quantity of calories to be consumed. The first terminal device determines whether remaining valid guide content of the subscribed fitness guidance can meet the requirement of the user. If the remaining valid guide content can meet the requirement of the user, the first terminal device generates the user requirement information, and sends the user requirement information to the body fitness service platform. The body fitness service platform formulates a guide strategy (also referred to as first service information of the running service) based on the user requirement information, and sends the guide strategy to the first terminal device.

S508: The first terminal device sends second service information to the first IoT device based on the first service information.

The first service information may be understood as service information of the first service communicated between the first terminal device and the IoT server, and the second service information may be understood as service information of the first service communicated between the first terminal device and the first IoT terminal device. The first service information and the second service information may be service data related to the first service or signaling data related to the first service. This is not limited in this embodiment of this application. The following discusses the first service information and the second service information in two cases.

Case 1: The first service information is the same as the second service information. and the first terminal device may directly send, to the first IoT terminal device, the first service information received from the IoT server. For example, with reference to the example of Manner 2 in S407, the guide strategy specified by the body fitness service platform based on the user requirement information is: A running speed is 5 km/h. a running distance is 10 km, and a slope is 5 degrees. The first terminal device sends the data to the treadmill. The data may be displayed on the treadmill for user reference.

Case 2: The first service information is different from but associated with the second service information, and the first terminal device may generate the second service information based on the first service information, and send the generated second service information to the first IoT terminal device. Further, the first terminal device may generate the second service information based on the first service information and the information about the first IoT terminal device, and send the generated second service information to the first IoT terminal device. For example, with reference to the example of Manner 2 in S407, the guide strategy specified by the body fitness service platform based on the user requirement information is: A running speed is 5 km/h, a running distance is 10 km, and a slope is 5 degrees. The first terminal device determines, based on the data, that the treadmill needs to report a parameter such as a speed, a distance, or a heartbeat. Therefore, the second service information sent by the first terminal device to the treadmill may indicate that the parameter such as the speed, the distance, or the heartbeat needs to be reported. To be specific. if the first IoT terminal device is the treadmill, the first terminal device may determine, based on the service information included in the information about the treadmill in S406. whether the treadmill supports a service such as speed reporting, distance reporting, or heartbeat reporting. If the treadmill supports the service, the first terminal device sends the second service information to the treadmill.

Further, in Case 1 and Case 2, if the information about the first IoT terminal device in S506 includes the first service port address used by the first terminal device to access the first IoT terminal device through the soft bus channel, the first terminal device may send the second service information to the first service port address through the soft bus channel.

Figure 6:
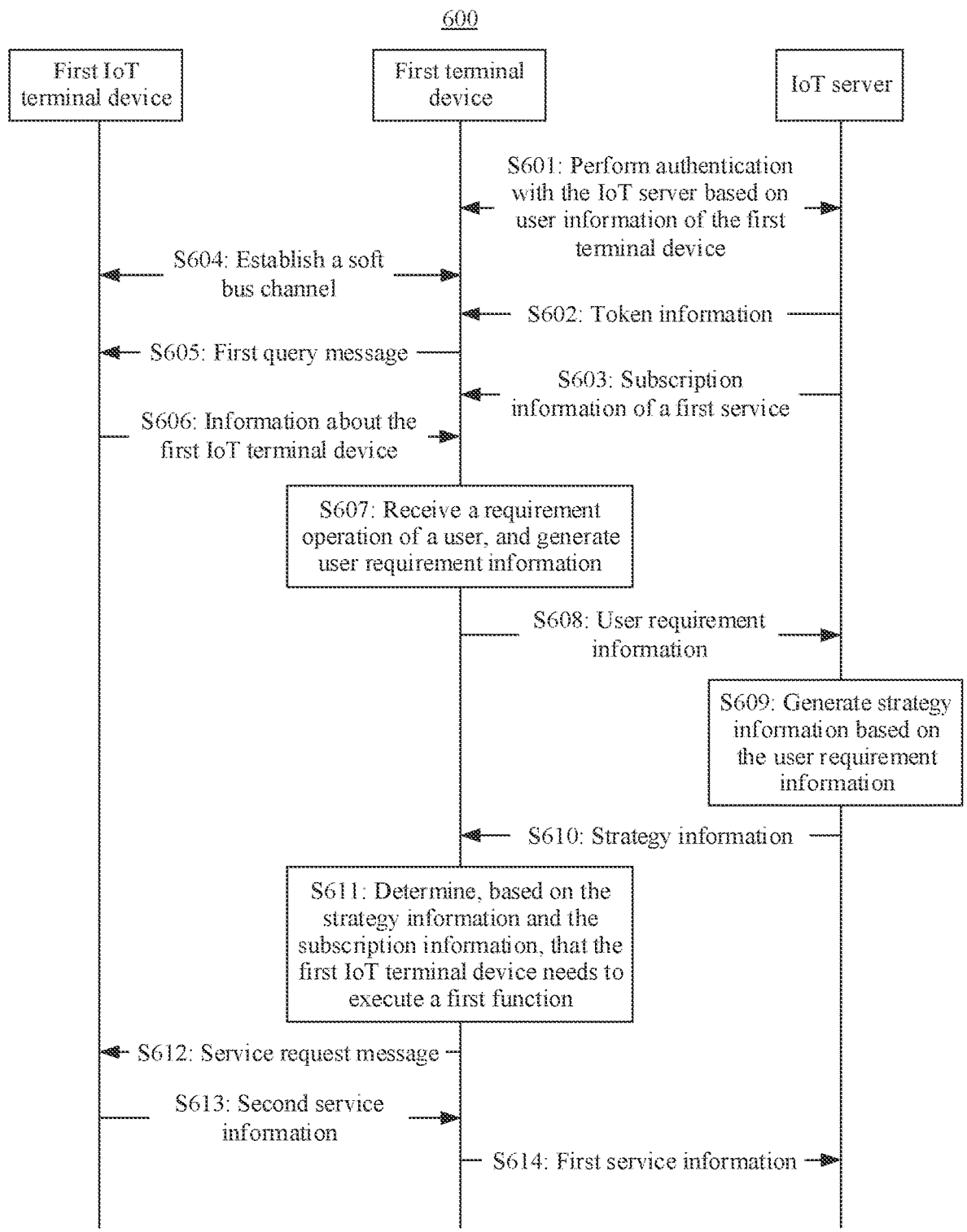

The foregoing content describes downlink transmission with reference to the method 500. To be specific, the IoT server sends the first service information to the first terminal device, and the first terminal device sends the second service information to the first IoT terminal device. The following describes uplink transmission with reference to a method 600 in FIG. 6.

S601 to S606 are the same as S501 to S506.

S607: A first terminal device may receive, by using a first application, an operation that is input by a user and that is for a requirement of a first service, and the first terminal device generates user requirement information based on a requirement of the user and subscription information of the first service.

S608: The first terminal device reports the user requirement information to an IoT server.

S609: The IoT server generates strategy information based on the user requirement information.

Specifically, the IoT server is configured to: guide or plan the first service, generate the strategy information based on the user requirement information. and send the strategy information to the first terminal device.

S610: The IoT server sends the strategy information to the first terminal device.

S611: The first terminal device determines, based on the strategy information and the subscription information, that a first IoT terminal device needs to execute the first service.

It should be noted that some services require participation of the user, that is, an operation that requires the user to input a requirement. In this case, the method 600 may include S607 to S611. Some services do not require participation of the user, that is, the user does not perform an operation of inputting a requirement in the first application of the first terminal device. Therefore. S607 to S611 may not exist. In this case, as an alternative manner of S607 to S611, after the first terminal device receives information about the first IoT terminal device sent by the first IoT terminal device in S606, the first terminal device directly determines to execute the first service without user participation. For example, the first service is a meter reading service, and the first IoT terminal device is a water meter. In this case, the information about the first IoT terminal device reported by the first IoT terminal device in S606 includes at least one piece of service information of the first IoT terminal device, and first service information included in the at least one piece of service information indicates that the first IoT terminal device has a service of reporting water meter data. Therefore, the first terminal device determines that the first IoT terminal device needs to execute the service of reporting the water meter data.

S612: The first terminal device sends a service request message to the first IoT terminal device.

The service request message is used to request the first IoT terminal device to report service information of the first service, and the service request information may further include a second service port address for the first IoT terminal device to report the first service to the first terminal device.

Specifically, the information about the first IoT terminal device in S606 may include address request information and the first service information of the first IoT terminal device. If in S511, the first terminal device determines that the first service that needs to be executed by the first IoT terminal device is a service that is indicated by the first service information and that is reported by the first IoT terminal device in S506, the first terminal device sends the service request message to the first IoT terminal device.

S613: The first IoT terminal device sends, to the first terminal device through the soft bus channel based on the second service port address, second service information corresponding to the first service.

S614: The first terminal device sends first service information to the IoT server based on token information, where the first service information is associated with the second service information.

The first service information may be understood as service information of the first service communicated between the first terminal device and the IoT server, and the second service information may be understood as service information of the first service communicated between the first terminal device and the first IoT terminal device. The first service information and the second service information may be service data related to the first service or signaling data related to the first service. This is not limited in this embodiment of this application. The following discusses the first service information and the second service information in two cases.

Case 1: The first service information is the same as the second service information. and the first terminal device may directly send. to the IoT server, the second service information received from the first IoT terminal device. For example, if the first service is running, the first service information is heartbeat information, the first IoT terminal device is a treadmill, and the IoT server is a body fitness service platform, the treadmill may report the heartbeat information of the user, and a mobile phone directly reports the heartbeat information to the body fitness service platform. The body fitness service platform determines a fitness effect that can be achieved by the user based on the heartbeat information, so that a fitness strategy can be further specified.

Case 2: The first service information is different from but associated with the second service information, and the first terminal device may generate the first service information based on the second service information, and send the generated first service information to the IoT server. For example, the second service information reported by the first IoT terminal device is the heartbeat information. The first terminal device calculates, based on the heartbeat information, calories consumed by the user, and then sends the calories as the first service information to the IoT server. The IoT server may further formulate a fitness strategy based on the calories reported by the first terminal device.

Figure 7:
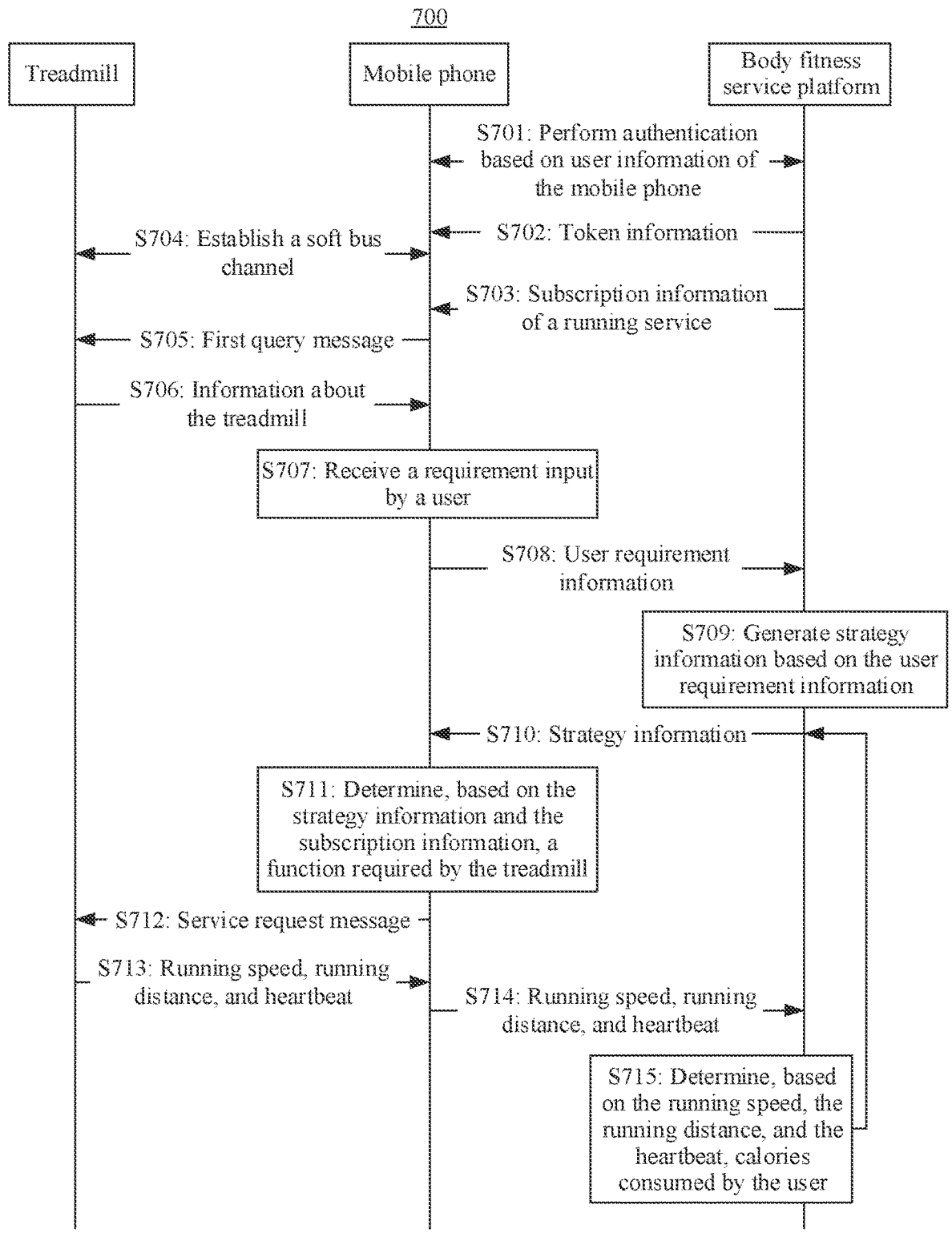

To better describe the service information communication method provided in this embodiment of this application, the following describes a method 700 with reference to FIG. 7 by using an example in which a first terminal device is a mobile phone, a first IoT terminal device is a treadmill, an IoT server is a body fitness service platform. and a first service is a running service.

S701: The mobile phone performs authentication with the body fitness service platform.

Specifically, a health application is installed on the mobile phone, and a user inputs a login account on the health application of the mobile phone, where the login account is a Huawei account or a mobile phone number of the health application registered by the user. After the user inputs the login account on the health application, the mobile phone sends the login account to the body fitness service platform, and the body fitness service platform determines, based on the login account of the user, whether the health application on the mobile phone has registered or subscribed to a fitness guidance service corresponding to running. If the body fitness service platform determines, based on the login account. that the health application on the mobile phone has registered or subscribed to the fitness guidance service corresponding to running, the body fitness service platform determines that the authentication succeeds.

S702: The body fitness service platform sends token information to the mobile phone, and the mobile phone receives the token information.

The token information is used for communication between the mobile phone and the body fitness service platform.

S703: The body fitness service platform sends subscription information of a running service to the mobile phone.

Specifically, the body fitness service platform sends subscription information of the health guidance service subscribed by the mobile phone by using the health application to the health application of the mobile phone, for example, remaining available time of the subscribed health guidance service, or remaining available times, or remaining package information.

Optionally, in S703, after sending the token information to the mobile phone, the body fitness service platform may actively push the subscription information of the running service to the health application of the mobile phone.

Optionally, in S703, after receiving the token information, the mobile phone may send a second query message to the body fitness service platform. where the second query message is used to query the body fitness service platform for the subscription information of the running service. The body fitness service platform returns the subscription information of the running service to the mobile phone based on the second query message.

S704: The treadmill establishes a soft bus channel with the mobile phone.

That the treadmill establishes the soft bus channel with the mobile phone may be understood as that the treadmill is mounted on the mobile phone. In other words, the treadmill can communicate with the mobile phone. Vendors of the treadmill and the mobile phone may be a same vendor or different vendors. The soft bus channel can implement interconnection and interworking between devices of different vendors.

It should be noted that a sequence of any step of S704 and S701 to S703 is not limited. In other words, there is no limitation on a sequence of a process of establishing the soft bus channel between the treadmill and the mobile phone and a process of authenticating the mobile phone and the body fitness service platform, communicating the token information, or sending the subscription information of the running service.

S705: The mobile phone sends a first query message to the treadmill through g the soft bus channel, and the treadmill receives the first query message through the soft bus channel. where the first query message is used to query the treadmill for information about the treadmill.

S706: The treadmill sends the information about the treadmill to the mobile phone, and the mobile phone receives the information about the treadmill that is sent by the treadmill.

The information about the treadmill includes at least one of at least one piece of service information supported by the treadmill. basic information of the treadmill, or a first service port address used by the mobile phone to access the treadmill through the soft bus channel. The basic information of the treadmill includes a device name of the treadmill, a device type of the treadmill, vendor information of the treadmill, a vendor model of the treadmill, and the like.

For example, the information about the treadmill is as follows:

<deviceInfo>//Device information about the treadmill
        <deviceName>treadmill12020</deviceName>//Device name of the treadmill
        <deviceType>treadmill</deviceType>//Device type of the treadmill
        <manufactory>mmm</manufactory>//Vendor information of the treadmill
        <model>AAA</model>//Vendor model of the treadmill
        <defaultServicePort>um</defaultServicePort>//First service port address used by the mobile phone to access the treadmill through the soft bus channel
    <serviceList total="5">//The treadmill supports five services
        <service id="0">//Indicating that the treadmill may provide a service whose sequence number is 0
            <serviceType>query</serviceType>//A service type is a "query" type
            <serviceName>query Power</serviceName>//A service name is querying on/off of a power supply.
            <description>some information about the service</description>//Specific description of a service
            <serviceParam id="0">//Indicating that a current parameter is a $0^{th}$ input parameter of the service
                <paramName>power</paramName>//A parameter name is "power"
                <value>off</value>//An on/off value of the power supply may be off or on
            </serviceParam>//Parameter list of the service whose sequence number is 0
        </service>
        <service id="1">//Indicating that the treadmill may provide a service whose sequence number is 1
            <serviceType>set</serviceType>//A service type is "set"
            <serviceName>setPower</serviceName>/A service name is "setPower"
            <description>some information about the service</description>//Specific description of a service
            <serviceParam id="0">//Indicating that a current parameter is a $0^{th}$ input parameter of the service
                <paramName>power</paramName>//A parameter name is "power"
                <value>off</value>//An on/off value of the power supply may be off or on
            </serviceParam>//Parameter list of a service whose sequence number is 1
        </service>//
        service id="2">//Indicating that the treadmill may provide a service whose sequence number is 2
            <service Type>set</serviceType>//A service type is "set"
            <serviceName>setSpeed</serviceName>//A service name is "setSpeed"
            <description>some information about the service</description>//Specific description of a service
            <serviceParam id="0">//Indicating that a current parameter is a $0^{th}$ input parameter of the service
                <paramName>speed</paramName>//A parameter name is "speed"
                <value>int</value>//A value of the speed is an integer
            </serviceParam>//Parameter list of a service whose sequence number is 2
        </service>//
        <service id="3">//Indicating that the treadmill may provide a service whose sequence number is 3
            <serviceType>report</serviceType>//A service type is a "report" type
            <serviceName>heartRate</serviceName>//A service name is "heartRate"
            <description>register a service um for heart rate reporting</description>//Specific description of the heart rate
            <servicePort>um</servicePort>/Address request information, where if this field is empty, the address request information indicates requesting a service port address for reporting the heart rate by the treadmill from the mobile phone, and this field needs to be returned by the mobile phone to the treadmill
            <serviceParam id="0">//Indicating that a current parameter is a $0^{th}$ input parameter of the service
                <paramName>heartRate</paramName>//A parameter name is "heartRate"
            </serviceParam>//Parameter list of a service whose sequence number is 3
        </service>//
        <service id="4">//Indicating that the treadmill may provide a service whose sequence number is 4
            <service Type>report</serviceType>//A service type is a "report" type

```
<serviceName>distance</serviceName>//A service
    name is "distance"
<description>some information about the service</
    description>//Specific description of the distance
<servicePort>um</servicePort>//Address request
    information, where if this field is empty, the
    address request information indicates requesting a
    service port address for reporting the distance by
    the treadmill from the mobile phone, and this field
    needs to be returned by the mobile phone to the
    treadmill
<serviceParam id="0">//Indicating that a current
    parameter is a $0^{th}$ input parameter of the service
    <paramName>meters</paramName>//A unit of
        the parameter is "meter"
</serviceParam>Parameter list of a service whose
    sequence number is 4
</service>
    </serviceList>
</deviceInfo>
```

S707: The mobile phone receives a requirement input by the user.

Specifically, the user inputs a requirement of the user in the health application of the mobile phone, and the health application of the mobile phone receives the requirement input by the user. The requirement input by the user is an expected exercise effect. for example, the user wants to consume 1,000 calories.

After S704, S707 is performed. In other words, a sequence between S707 and S705 or S706 is not limited.

S708: The mobile phone reports user requirement information to the body fitness service platform.

S709: The body fitness service platform generates strategy information based on the user requirement information.

Specifically, the body fitness service platform formulates a running strategy for the user based on 1000 calories that the user wants to consume and that are indicated by the user requirement information. The strategy information indicates the running strategy. For example, the running strategy is that a running speed of the user is 7 km/h, a running distance is 10 km, and a heart rate is 120 per minute.

S710: The body fitness service platform sends the strategy information to the mobile phone. and the mobile phone receives the strategy information sent by the body fitness service platform.

S711: The mobile phone determines. based on the strategy information in S710 and the subscription information in S703, a function required by the treadmill.

For example, the running strategy indicated by the strategy information is that the running speed of the user is 7 km/h, the running distance is 10 km, and the heart rate is 120 per minute. and the mobile phone determines, based on the subscription information, that there are still 180 days left for the subscribed health guidance service. Therefore, the mobile phone may determine that the treadmill needs three functions: reporting the running speed, reporting the running distance. and reporting the heart rate.

Further, if the mobile phone determines, based on the information about the treadmill in S706, that the treadmill supports the three functions of reporting the running speed, reporting the running distance, and reporting the heart rate, S712 may be performed.

S712: The mobile phone sends a service request message to the treadmill.

The service request message is used to request, from the treadmill, functions such as reporting the running speed, reporting the running distance, and reporting a heartbeat The service request message may further include service port addresses used by the treadmill to report the running speed, the running distance, and the heartbeat to the mobile phone. The service port addresses for reporting the running speed, the running distance, and the heartbeat may be a same service port address or different service port addresses.

Further. the mobile phone may determine. based on the information about the treadmill in S706, a service that may be used to query whether the treadmill is started, that is, the treadmill has a service that is used to query whether the treadmill is started. Before S712, the mobile phone may send, to the treadmill through the soft bus channel, a message for querying whether the treadmill is started. If the treadmill is started, the treadmill may return a message indicating that the treadmill is started to the mobile phone. S712 is performed only when the mobile phone determines that the treadmill is already started.

S713: The treadmill reports the running speed, the running distance, and the heartbeat to the mobile phone through the soft bus channel based on the service port address included in the service request message.

For example, in this case, the second service information in S613 may be the running speed, the running distance, and the heartbeat in S713.

Specifically, the treadmill may obtain, by using a sensor, the running speed. the running distance, and the heartbeat of the user on the treadmill.

S714: The mobile phone sends the running speed, the running distance, and the heartbeat in S713 to the body fitness service platform based on the token information.

For example. in this case, the first service information in S614 may be the running speed, the running distance. and the heartbeat in S714.

S715: The body fitness service platform determines, based on the running speed, the running distance, and the heartbeat, calories consumed by the user.

Specifically, the body fitness service platform determines, based on the running speed, the running distance, and the heartbeat, the calories consumed by the user, and the body fitness service platform determines whether the calories consumed by the user reach the calories expected by the user in the user requirement information in S708. If the calories consumed by the user do not reach the calories expected by the user in the user requirement information in S708, the body fitness service platform may generate the strategy information again, and perform S710 to S715 cyclically until the calories that the user expects to consume are reached.

In the foregoing method 700, user information of the treadmill is the same as user information of the mobile phone, that is, the mobile phone and the treadmill are of a same user. In this way, when reporting data from the treadmill, the mobile phone avoids carrying the information about the treadmill. Binding the treadmill to the body fitness service platform can also be avoided. When the body fitness service platform and the treadmill are devices of different vendors, the body fitness service platform and the treadmill can communicate to improve applicability. For example. the treadmill in the method 700 is provided by a vendor A in a home of the user, but the user on the treadmill that is from vendor A may exercise with the help of guidance of a body fitness service platform that is from a vendor B. If the user runs on the treadmill that is from a vendor C and that is in a gym, the user may also exercise with the help of the guidance of the body fitness service platform that is from the vendor B, so that it can also be avoided that treadmills of different vendors are bound to the body fitness service platform. In addition, the soft bus channel may implement interconnection and interworking between devices of different vendors, that is, the treadmill and the mobile phone may be produced by a same vendor or may be produced by different vendors. In other words, in the foregoing solution, the treadmill, the mobile phone, and the body fitness service platform may be from a same vendor or different vendors, so that interconnection and interworking between devices produced by different vendors can be implemented, thereby improving applicability and reducing costs.

Figure 8:
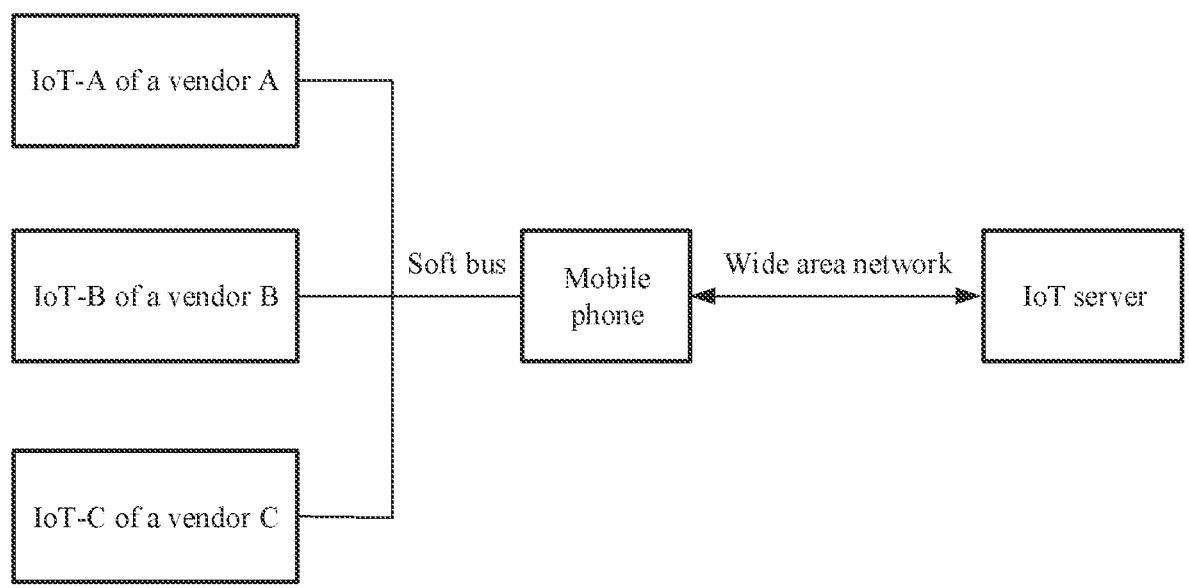
FIG. 8 is a schematic diagram of a possible application scenario according to an embodiment of this application.

Therefore, in the foregoing method embodiment, as shown in FIG. 8, if the first terminal device is a mobile phone, IoT terminal devices from different vendors may be mounted to the mobile phone by using a soft bus. An IoT-A from a vendor A, an IoT-B from a vendor B, and an IoT-C from a vendor C can be mounted to the mobile phone through the soft bus channel. In this way, interconnection and interworking between devices from different vendors can be implemented. The IoT-A, the IoT-B, the IoT-C, and the mobile phone are devices of a same user Therefore, in a process of authentication between the mobile phone and the IoT server, user information and the IoT server may be used. so as to avoid a need to use information about the IoT terminal device to perform authentication with the IoT server, and avoid a need to deploy a dedicated IoT server for a dedicated vendor. This reduces costs and improving applicability.

With reference to FIG. 1 to FIG. 8, the foregoing describes the service information communication method embodiments provided in embodiments of this application. The following describes a service information communication apparatus embodiment provided in an embodiment of this application.

In this embodiment, electronic devices may be divided into function modules according to the foregoing method. For example, each function module may be obtained through division based on a corresponding function. or two or more functions may be integrated into one processing module. The integrated module may be implemented in a form of hardware. It should be noted that, in this embodiment, division into the modules is an example, is merely logical function division. and there may be other division during actual implementation It should be noted that related content of all steps in the foregoing method embodiments may be cited in function description of corresponding function modules. Details are not described herein again.

The electronic devices provided in this embodiment are configured to perform the service information communication method. Therefore, a same effect as that of the foregoing implementation method can be achieved. When an integrated unit is used, each electronic device may include a processing module, a storage module, and a communication module. The processing module may be configured to control and manage actions of each electronic device. For example, the processing module may be configured to support the electronic device in performing steps performed by a processing unit. The storage module may be configured to support the electronic device in storing program code, data, and the like. The communication module may be configured to support communication between the electronic device and another device.

The processing module may be a processor or a controller. The processing module may implement or perform various example logical blocks, modules, and circuits described with reference to content disclosed in this application. The processor may alternatively be a combination for implementing a computing function. for example, a combination including one or more microprocessors, or a combination of a digital signal processor (digital signal processor, DSP) and a microprocessor. The storage module may be a memory. The communication module may be specifically a device, for example, a radio frequency circuit, a Bluetooth chip, or a Wi-Fi chip. that interacts with another electronic device.

Figure 9:
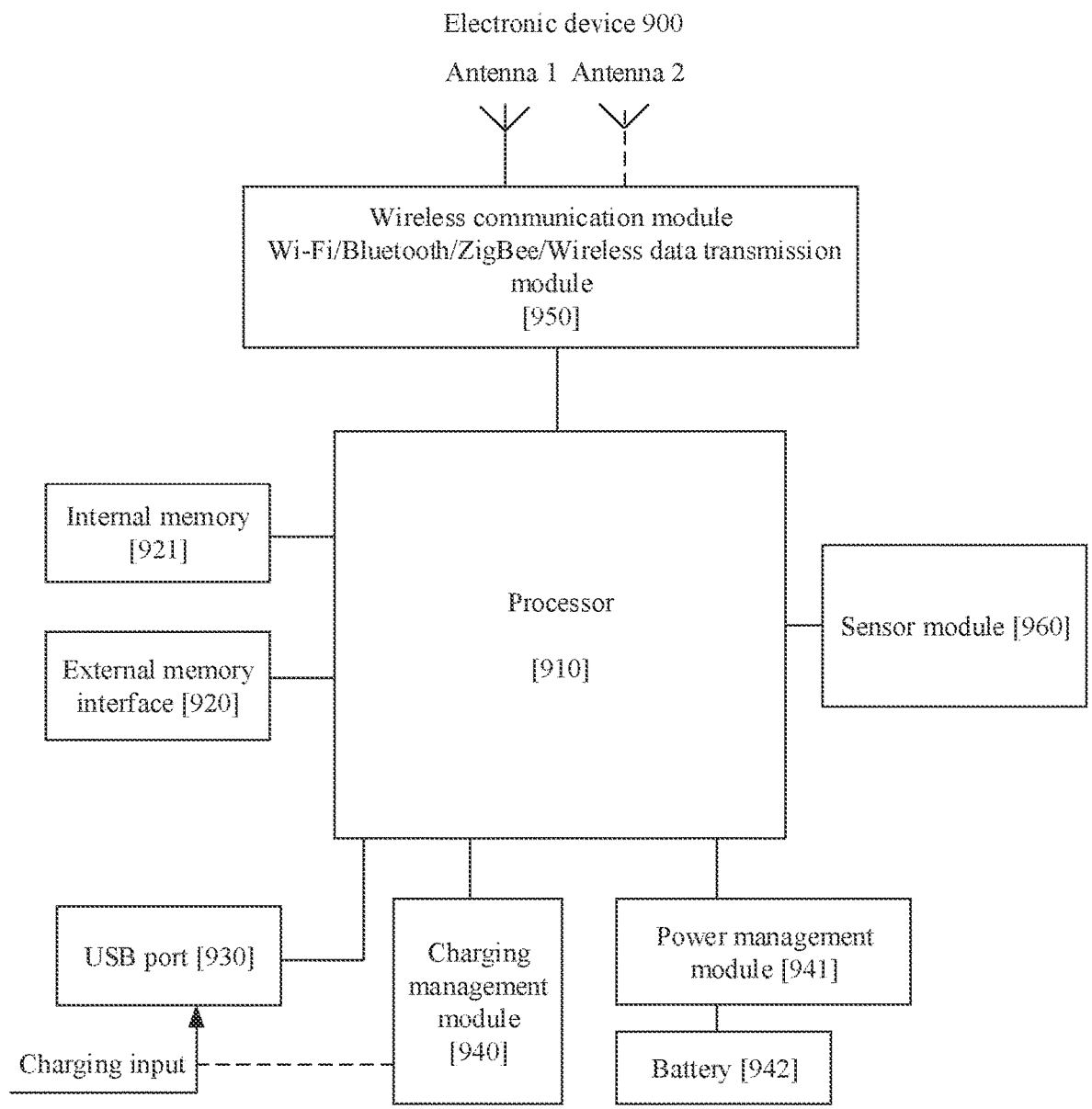
FIG. 9 is a schematic block diagram of an electronic device according to an embodiment of this application.

For example, FIG. 9 is a schematic diagram of a hardware structure of an electronic device 900. As shown in FIG. 9, the electronic device 900 may include a processor 910. an external memory interface 920. an internal memory 921, a universal serial bus (universal serial bus, USB) port 930, a charging management module 940, a power management module 941. a battery 942, an antenna 1, an antenna 2, a wireless communication module 950, a sensor module 960, and the like.

It may be understood that the structure shown in this embodiment of this application constitutes no specific limitation on the electronic device 900. In some other embodiments of this application, the electronic device 900 may include more or fewer components than those shown in the figure, or some components may be combined. or some components may be split. or different component arrangements may be used. The components shown in the figure may be implemented by hardware, software, or a combination of software and hardware.

The processor 910 may include one or more processing units. For example, the processor 910 may include an application processor (application processor, AP), a modem processor, a graphics processing unit (graphics processing unit, GPU), an image signal processor (image signal processor. ISP), a controller, a video codec, a digital signal processor (digital signal processor, DSP). a baseband processor, and/or a neural-network processing unit (neural-network processing unit, NPU). Different processing units may be independent components. or may be integrated into one or more processors. In some embodiments. the electronic device 900 may alternatively include one or more processors 910. The controller may generate an operation control signal based on instruction operation code and a time sequence signal, to complete control of instruction fetching and instruction execution.

In some embodiments. the processor 910 may include one or more interfaces. The interface may include an inter-integrated circuit (inter-integrated circuit, I2C) interface, an integrated circuit sound (integrated circuit sound, I12S) interface, a pulse code modulation (pulse code modulation. PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a SIM card interface, a USB port, and/or the like The USB port 930 is a port that conforms to a USB standard specification, and may be specifically a mini USB port, a micro USB port, a USB Type-C port, or the like. The USB port 930 may be used to connect to a charger to charge the electronic device 2600, or may be used to communicate data between the electronic device 900 and a peripheral device.

It may be understood that an interface connection relationship between the modules illustrated in embodiments of this application is merely an example for description, and does not constitute a limitation on the structure of the electronic device 900. In some other embodiments of this application, the electronic device 900 may alternatively use an interface connection manner different from that in the foregoing embodiment, or use a combination of a plurality of interface connection manners.

A wireless communication function of the electronic device 900 may be implemented by using the antenna 1, the antenna 2, the wireless communication module 950, and the like.

The wireless communication module 950 may provide a wireless communication solution that is applied to the electronic device 900 and that includes Wi-Fi (including Wi-Fi sensing and Wi-Fi AP), Bluetooth (Bluetooth, BT), wireless data transmission modules (for example, 433 MHz, 868 MHz and 915 MHZ), and the like. The wireless communication module 950 may be one or more components integrating at least one communication processor module. The wireless communication module 950 receives an electromagnetic wave by using the antenna 1 or the antenna 2 (or the antenna 1 and the antenna 2), performs filtering and frequency modulation processing on an electromagnetic wave signal, and sends a processed signal to the processor 910. The wireless communication module 950 may further receive a to-be-sent signal from the processor 910, perform frequency modulation and amplification on the signal, and convert the signal into an electromagnetic wave for radiation through the antenna 1 or the antenna 2.

The external memory interface 920 may be used to connect to an external storage card, for example, a micro SD card, to extend a storage capability of the electronic device 900. The external storage card communicates with the processor 910 through the external memory interface 920, to implement a data storage function. For example, files such as music and videos are stored in the external storage card.

The internal memory 921 may be configured to store one or more computer programs, and the one or more computer programs include instructions. The processor 910 may run the instructions stored in the internal memory 921, to enable the electronic device 900 to perform a service communication method provided in some embodiments of this application, various applications, data processing, and the like. The internal memory 21 may include a code storage region and a data storage region. The code storage region may store an operating system. The data storage region may store data created during use of the electronic device 00, and the like. In addition, the internal memory 21 may include a high-speed random access memory. or may include a nonvolatile memory. for example, one or more magnetic disk storage devices, a flash memory device, or a universal flash storage (universal flash storage, UFS). In some embodiments. the processor 10 may run the instructions stored in the internal memory 21 and/or the instructions stored in the memory disposed in the processor 10, to enable the electronic device 00 to perform the service information communication method provided in embodiments of this application, another application, and data processing.

The electronic device 900 includes but is not limited to a smartphone, a tablet computer, a desktop computer, a portable electronic device (such as a laptop computer, Laptop), a smart television (such as a smart screen), a vehicle-mounted computer, a smart speaker, an augmented reality (augmented reality, AR) device. a virtual reality (virtual reality, VR) device. another intelligent device with a display, a wearable electronic device with a wireless communication function (such as a smartwatch and smart glasses), another intelligent device with a speaker, and the like. An example embodiment of the electronic device includes but is not limited to a portable electronic device using iOS®, Android®, Harmony R. Windows R, Linux, or another operating system.

This embodiment further provides a computer-readable storage medium. The computer-readable storage medium stores a computer program. When the computer program is run on an electronic device, the electronic device is enabled to perform the service information communication method in the foregoing embodiment.

This embodiment further provides a computer program product. When the computer program product runs on a computer, the computer is enabled to perform the service information communication method in the foregoing embodiment.

In addition, an embodiment of this application further provides an apparatus. The apparatus may be specifically a chip. a component. or a module. The apparatus may include a processor and a memory that are connected. The memory is configured to store computer executable instructions. When the apparatus runs, the processor may execute the computer executable instructions stored in the memory, so that the chip performs the service information communication method in the foregoing embodiment.

The electronic device, the computer storage medium, the computer program product, or the chip provided in embodiments are all configured to perform the corresponding method provided above. Therefore. for beneficial effects that can be achieved, refer to beneficial effects in the corresponding method provided above. Details are not described herein again.

From the description of the foregoing implementations, a person skilled in the art may understand that, for convenience and brevity of description, division into the foregoing function modules is merely used as an example for description. In actual application, the foregoing functions can be allocated to different function modules and implemented according to a requirement, that is, an inner structure of an apparatus is divided into different function modules to implement all or some of the functions described above.

It should be understood that the apparatus and method disclosed in the several embodiments provided in this application may be implemented in other manners. The apparatus embodiment described above is merely an example For example, division into modules or units is merely logical function division. In actual implementation, there may be another division manner. For example, a plurality of units or components may be combined or integrated into another apparatus. In addition, some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms The units described as separate parts may or may not be physically separate. A component displayed as a unit may be a physical unit or a plurality of physical units. That is, the component may be located in one place, or may be distributed on a plurality of different places. Some or all of the units may be selected based on actual requirements to achieve the objectives of the solutions.

In addition, function units in embodiments of this application may be integrated into one processing unit. The function units can also exist alone physically. Alternatively, some units may be integrated into one unit, and some units exist alone physically. The integrated unit may be implemented in a form of hardware, or may be implemented in a form of a software function unit.

When the integrated unit is implemented in a form of a software function unit and sold or used as an independent product, the integrated unit may be stored in a readable storage medium. Based on such an understanding, all or some of the technical solutions of embodiments of this application may be implemented in a form of a software product. The software product is stored in a storage medium. The software product includes several instructions for instructing a device (which may be a single-chip microcomputer, a chip, or the like) or a processor (processor) to perform all or some of the steps of the methods in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

It should be noted that all or some (for example, a part or all of any feature) of the foregoing embodiments provided in this application may be randomly combined or used in combination with each other.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A service information communication method, comprising:
    communicating, by a terminal device based on token information, first service information of a first service with an Internet of things (IoT) server corresponding to the first service, wherein the token information is obtained from the IoT server by the terminal device after performing authentication with the IoT server based on only user information of the terminal device, and wherein the token information is used by the terminal device to communicate with the IoT server without transmitting device information of the IoT terminal device to the IoT server; and
    communicating, by the terminal device, second service information of the first service with an IoT terminal device corresponding to the first service, wherein the second service information is associated with the first service information, and wherein the user information of the terminal device is same as user information of the IoT terminal device.

2. The method according to claim 1, wherein the second service information of the first service is communicated with the IoT terminal device through a soft bus channel established by the terminal device with the IoT terminal device.

3. The method according to claim 2, wherein the method further comprises:
    sending, by the terminal device to the IoT terminal device through the soft bus channel, a first query message to query the IoT terminal device for information about the IoT terminal device; and
    receiving, by the terminal device through the soft bus channel, the information about the IoT terminal device sent by the IoT terminal device based on the first query message.

4. The method according to claim 3, wherein the first service is received by the terminal device from the IoT server based on the token information, and wherein the second service information is sent by the terminal device to a first service port address of the IoT terminal device comprised in the information about the IoT terminal device through the soft bus channel.

5. The method according to claim 3, wherein the information about the IoT terminal device comprises service information and address request information for requesting, from the terminal device, a service port address for the IoT terminal device to report the first service indicated by the service information, and the method further comprises:
    sending, by the terminal device, a service request message to the IoT terminal device based on the address request information and the service information, wherein the service request message is used to request the IoT terminal device to report the service information of the first service, and the service request message comprises a second service port address for the IoT terminal device to report the first service, wherein the second service information is received by the terminal device through the soft bus channel based on the second service port address, and wherein the first service information is sent by the terminal device to the IoT server based on the token information.

6. The method according to claim 3, wherein the information about the IoT terminal device comprises at least one of a device type, vendor information, or a device name of the IoT terminal device.

7. The method according to claim 1, wherein after the terminal device obtains the token information from the IoT server, the method further comprises:
    receiving, by the terminal device based on the token information, subscription information of the first service from the IoT server, wherein the first service information is communicated with the IoT server based on the subscription information and the token information.

8. An electronic device, comprising:
    one or more processors;
    a memory coupled to the one or more processors and storing programming instructions for execution by the one or more processors to perform operations comprising:
        communicating, based on token information, first service information of a first service with an Internet of things (IoT) server corresponding to the first service, wherein the token information is obtained from the IoT server by the electronic device after performing authentication with the IoT server based on only user information of the electronic device, and wherein the token information is used by the electronic device to communicate with the IoT server without transmitting device information of the IoT terminal device to the IoT server; and
        communicating second service information of the first service with an IoT terminal device corresponding to the first service, wherein the second service information is associated with the first service information, and wherein the user information of the electronic device is same as user information of the IoT terminal device.

9. The electronic device according to claim 8, wherein the second service information of the first service is communicated with the IoT terminal device through a soft bus channel established by the electronic device with the IoT terminal device.

10. The electronic device according to claim 9, wherein the operations further comprises:

sending, to the IoT terminal device through the soft bus channel, a first query message to query the IoT terminal device for information about the IoT terminal device; and receiving, through the soft bus channel, the information about the IoT terminal device sent by the IoT terminal device based on the first query message.

11. The electronic device according to claim 10, wherein the first service is received by the electronic device from the IoT server based on the token information, and wherein the second service information is sent by the electronic device to a first service port address of the IoT terminal device comprised in the information about the IoT terminal device through the soft bus channel.

12. The electronic device according to claim 10, wherein the information about the IoT terminal device comprises service information and address request information for requesting, from the electronic device, a service port address for the IoT terminal device to report the first service indicated by the service information, and the operations further comprises:

sending a service request message to the IoT terminal device based on the address request information and the service information, wherein the service request message is used to request the IoT terminal device to report the service information of the first service, and the service request message comprises a second service port address for the IoT terminal device to report the first service, wherein the second service information is received by the electronic device through the soft buss channel based on the second service port address, and wherein the first service information is sent by the electronic device to the IoT server based on the token information.

13. The electronic device according to claim 10, wherein the information about the IoT terminal device comprises at least one of a device type, vendor information, or a device name of the IoT terminal device.

14. The electronic device according to claim 8, wherein after the electronic device obtains the token information from the IoT server, the operations further comprises:

receiving, by the electronic device based on the token information, subscription information of the first service from the IoT server, wherein the first service information is communicated with the IoT server based on the subscription information and the token information.

15. A non-transitory computer-readable storage medium storing programming instructions for execution by one or more processors of a terminal device to perform operations comprising:

communicating, based on token information, first service information of a first service with an Internet of things (IoT) server corresponding to the first service, wherein the token information is obtained from the IoT server by the terminal device after performing authentication with the IoT server based on only user information of the terminal device, and wherein the token information is used by the terminal device to communicate with the IoT server without transmitting device information of the IoT terminal device to the IoT server; and communicating second service information of the first service with an IoT terminal device corresponding to the first service, wherein the second service information is associated with the first service information, and wherein the user information of the terminal device is same as user information of the IoT terminal device.

16. The non-transitory computer-readable storage medium according to claim 15, wherein the second service information of the first service is communicated with the IoT terminal device through a soft bus channel established by the terminal device with the IoT terminal device.

17. The non-transitory computer-readable storage medium according to claim 16, wherein the method further comprises:

sending, to the IoT terminal device through the soft bus channel, a first query message to query the IoT terminal device for information about the IoT terminal device; and receiving, through the soft bus channel, the information about the IoT terminal device sent by the IoT terminal device based on the first query message.

18. The non-transitory computer-readable storage medium according to claim 17, wherein the first service is received by the terminal device from the IoT server based on the token information, and wherein the second service information is sent by the terminal device to a first service port address of the IoT terminal device comprised in the information about the IoT terminal device through the soft bus channel.

19. The non-transitory computer-readable storage medium according to claim 17, wherein the information about the IoT terminal device comprises service information and address request information for requesting, from the terminal device, a service port address for the IoT terminal device to report the first service indicated by the service information, and the method further comprises:

sending a service request message to the IoT terminal device based on the address request information and the service information, wherein the service request message is used to request the IoT terminal device to report the service information of the first service, and the service request message comprises a second service port address for the IoT terminal device to report the first service, wherein the second service information is received by the terminal device through the soft buss channel based on the second service port address, and wherein the first service information is sent by the terminal device to the IoT server based on the token information.

20. The non-transitory computer-readable storage medium according to claim 17, wherein the information about the IoT terminal device comprises at least one of a device type, vendor information, or a device name of the IoT terminal device.

* * * * *